US005780072A

United States Patent [19]

Kurisu et al.

[11] Patent Number: 5,780,072

[45] Date of Patent: Jul. 14, 1998

[54] MANUFACTURING APPARATUS FOR MANUFACTURING TM DUAL MODE DIELECTRIC RESONATOR APPARATUS

[75] Inventors: Toru Kurisu, Kyoto; Hidekazu Wada, Ibaraki; Shin Abe, Mukou, all of Japan

[73] Assignee: Murata Manufacturing Co., Ltd., Japan

[21] Appl. No.: 876,153

[22] Filed: Jun. 13, 1997

Related U.S. Application Data

[62] Division of Ser. No. 637,431, Apr. 25, 1996, Pat. No. 5,659,275, which is a continuation of Ser. No. 359,920, Dec. 20, 1994, abandoned.

[30] Foreign Application Priority Data

Dec. 24, 1993 [JP] Japan .............................. P05-347592

[51] Int. Cl.[6] .................................................. B29C 43/36

[52] U.S. Cl. .......................... 425/195; 425/193; 425/414; 425/468; 425/DIG. 10; 249/63; 249/64

[58] Field of Search .................................. 425/193, 195, 425/577, 414, 423, 468, DIG. 10; 249/63, 64

[56] References Cited

U.S. PATENT DOCUMENTS

| | | | |
|---|---|---|---|
| 4,213,932 | 7/1980 | Young | 425/DIG. 10 |
| 4,867,672 | 9/1989 | Sovensen | 425/577 |
| 5,275,548 | 1/1994 | Tibiletti | 425/468 |
| 5,389,329 | 2/1995 | Watanabe et al. | 425/577 |
| 5,458,473 | 10/1995 | Banji | 425/577 |

*Primary Examiner*—Khanh P. Nguyen
*Attorney, Agent, or Firm*—Ostrolenk, Faber, Gerb & Soffen, LLP

[57] ABSTRACT

In a TM dual mode dielectric resonator apparatus, a cross-shaped TM dual mode dielectric resonator is provided in an electrically conductive case, and the TM dual mode dielectric resonator includes first and second dielectric resonators integrally formed so as to be perpendicular to each other, and there is further formed at least one coupling groove for coupling an operation mode of the first dielectric resonator with that mode of the second dielectric resonator, wherein the coupling groove is formed on at least one of front and back surfaces of a crossing portion of the first and second dielectric resonators, in a diagonal direction thereof so as to cut electric lines of force of either one of an odd mode and an even mode. Alternatively, at least one coupling projection may be formed instead of the coupling groove.

2 Claims, 4 Drawing Sheets

MANUFACTURING APPARATUS FOR MANUFACTURING TM DUAL MODE DIELECTRIC RESONATOR APPARATUS

This is a Division of application Ser. No. 08/637,431, filed Apr. 25, 1996, now U.S. Pat. No. 5,659,275; which is a Continuation of application Ser. No. 08/359,920, filed Dec. 20, 1994, now abandoned.

BACKGROUND OF THE INVENTION

1. Field of the Invention

The present invention relates to a dielectric resonator apparatus, a method for adjusting a coupling coefficient of a dielectric resonator apparatus, and a manufacturing apparatus for manufacturing a dielectric resonator apparatus, and in particular, a TM dual mode dielectric resonator apparatus, a method for adjusting a coupling coefficient between two dielectric resonators of a TM dual mode dielectric resonator apparatus, and a manufacturing apparatus for manufacturing TM dual mode dielectric resonator apparatus.

2. Description of the Related Art

FIG. 5 shows a conventional TM dual mode dielectric resonator apparatus 51 comprising a cross-shaped TM dual mode dielectric resonator 52, which is disclosed in the Japanese patent Laid-open publication No. 63-313901.

Referring to FIG. 5, in the conventional TM dual mode dielectric resonator apparatus 51, there is provided or mounted the TM dual mode dielectric resonator 52 within an electrically conductive case 53 which functions as a waveguide. The TM dual mode dielectric resonator 52 is made of a dielectric ceramics material, and is constituted by integrally forming two TM mode rectangular-cylinder-shaped dielectric resonators 54 and 55 in a shape of a cross so that the longitudinal direction of the dielectric resonator 54 is perpendicular to that of the dielectric resonator 55. Further, the case 53 is constituted by forming electrically conductive electrodes 57 on all the surfaces of a case main body 56 made of a dielectric ceramics material by plating the cane with a metal paste, by a vapor deposition method for depositing a thin metal film on the case, or by another method, and the case main body 56 is formed integrally and simultaneously with the TM dual mode dielectric resonator 52. In a crossing portion of the two dielectric resonators 54 and 55 (referred to as a crossing portion hereinafter) formed in a shape of the cross of the TM dual mode dielectric resonator 52, coupling grooves 58 for coupling an operation mode of the dielectric resonator 54 with that of the dielectric resonator 55 are formed so as to have longitudinal lengths each from the front surface of the dielectric resonators 54 and 55 to the back surface thereof, and so as to have depths each extending from two corners of the crossing portion which oppose each other towards the center of the crossing portion in a diagonal direction of the crossing portion.

As shown in FIG. 5, the following electric lines of force are in the TM dual mode dielectric resonator 52:

(a) electric lines $E_1$ and $E_2$ of force of the respective dielectric resonators 54 and 55 parallel to respective longitudinal directions thereof which are indicated by alternate long and short dash lines;

(b) electric lines Ee of force of the even mode extending from the left end of the dielectric resonator 54 through the crossing portion of the two dielectric resonators 54 and 55 to the top end of the dielectric resonator 55 and vice versa, and also extending from the bottom end of the dielectric resonator 55 through the crossing portion to the right end of the dielectric resonator 54 and vice versa, which are indicated by dotted lines; and (c) the other electric lines Eo of force of the odd mode extending from the right end of the dielectric resonator 54 through the crossing portion to the top end of the dielectric resonator 55 and vice versa, and also extending from the bottom end of the dielectric resonator 55 through the crossing portion to the left end of the dielectric resonator 54 and vice versa, which are indicated by solid lines, wherein the electric lines $E_1$ of force are generated by the dielectric resonator 54, the electric lines $E_2$ of force are generated by the dielectric resonator 55, and the electric lines Ee and Eo are generated in the TM dual mode dielectric resonator 52 shown in FIG. 5.

As shown in FIG. 5, since the two grooves 58 are formed in the two corners opposing each other in a diagonal direction of the crossing portion of the TM dual mode dielectric resonator 52, the effective dielectric constant in the odd mode in which the electric lines Eo of force pass through the grooves 58 is different from that in the even mode in which the electric lines Ee of force pass through a portion where no groove 58 is formed, and thus a coupling is caused between the operation modes of the two dielectric resonators 54 and 55.

For the mass production of the conventional TM dual mode resonator apparatus 51, a dielectric ceramics molded body comprised of both the TM dual mode dielectric resonator 52 and the case main body 56 of the dielectric resonator apparatus 51 having the above-mentioned structure is formed using a pair of molds 59.

FIG. 6 is a perspective view of one mold 59 (see FIG. 6) of a pair of molds, and another mold (not shown) has a symmetrical shape with respect to a mold opening surface 60, wherein there is formed a space for forming the molded body between a pair of molds 59. Referring to FIG. 6, reference numeral 61 denotes a cavity of a rectangular-ring-shaped concave shape for forming the case main body 56 which is formed in the inner peripheral portion of the mold 59, reference numeral 62 denotes a cavity of a cross-shaped concave shape for forming the TM dual mode dielectric resonator 52 which is formed in the inner side of the cavity 61, and reference numeral 63 denotes projections for forming the coupling grooves 58 which are formed so as to project from inner projections 64 towards the center of the cavity 62 in a diagonal direction thereof.

In the TM dual mode dielectric resonator 52 provided in the above-mentioned dielectric resonator apparatus 51, a coupling coefficient between both the dielectric resonators 54 and 55 can be adjusted by changing the respective depths in the diagonal direction of the coupling grooves 58. However, the adjustment of the depths of the coupling grooves 58 is performed by cutting inner walls of the coupling grooves 58 after firing the dielectric ceramics molding body or after manufacturing the dielectric resonator apparatus 51. This cutting process takes a long time.

Further, in the case of manufacturing a plurality of kinds of dielectric resonator apparatus 51 having coupling coefficients different from each other, it is required to use a number of molds 59 corresponding to the number of kinds of dielectric resonator apparatus 51. This results in an expensive manufacturing cost of the molds 59.

Furthermore, since the opening direction of a pair of molds 59 is substantially perpendicular to the depth direction of the coupling grooves 58, it is difficult to remove the coupling grooves 58 from the molds 59, and further it is difficult to design the molds 59.

SUMMARY OF THE INVENTION

An object of the present invention is therefore to provide a TM dual mode dielectric resonator apparatus comprising a cross-shaped TM dual mode dielectric resonator having a structure capable of changing the coupling coefficient, capable of easily forming the TM dual mode dielectric resonator using a pair of molds thereof and capable of achieving improvement of the mass productivity thereof.

Another object of the present invention is to provide a method for adjusting a coupling coefficient between two dielectric resonators of a cross-shaped TM dual mode dielectric resonator of a TM dual mode dielectric resonator apparatus having a structure capable of changing the coupling coefficient, capable of easily forming the TM dual mode dielectric resonator using a pair of molds thereof and capable of achieving improvement of the mass productivity thereof.

A further object of the present invention is to provide a manufacturing apparatus for manufacturing a TM dual mode dielectric resonator apparatus comprising a cross-shaped TM dual mode dielectric resonator having a structure capable of changing the coupling coefficient, capable of easily forming the TM dual mode dielectric resonator using a pair of molds thereof and capable of achieving improvement of the mass productivity thereof.

In order to achieve the aforementioned objective, according to one aspect of the present invention, there is provided a dielectric resonator apparatus comprising:

an electrically conductive case;

a cross-shaped TM dual mode dielectric resonator provided in said case, said TM dual mode dielectric resonator comprising first and second dielectric resonators integrally formed so as to be perpendicular to each other; and at least one coupling groove for coupling an operation mode of said first dielectric resonator with an operation mode of said second dielectric resonator, formed on at least one of a front surface and a back surface of a crossing portion of said first and second dielectric resonators, in a diagonal direction of said crossing portion so as to cut electric lines of force of either one of an odd mode and an even mode.

According to another aspect of the present invention, instead of the above-described coupling groove, the dielectric resonator apparatus comprises:

at least one coupling projection for coupling an operation mode of said first dielectric resonator with an operation mode of said second dielectric resonator, formed on at least one of a front surface and a back surface of a crossing portion of said first and second dielectric resonators, in a diagonal direction of said crossing portion so as to disturb electric lines of force of either one of an odd mode and an even mode.

According to a further aspect of the present invention, there is provided a method for adjusting a coupling coefficient between first and second dielectric resonators of the above described cross-shaped TM dual mode dielectric resonator of a dielectric resonator apparatus, comprising the step of:

adjusting the coupling coefficient between said first and second dielectric resonators by changing the depth of said at least one coupling groove, or the height of said at least one coupling projection in a direction towards front and back surfaces of said case.

According to a further aspect of the present invention, there is provided the above described manufacturing apparatus for manufacturing a dielectric resonator apparatus with at least one coupling groove, wherein said manufacturing apparatus comprises:

a pair of main molds each having a cavity for forming said TM dual mode dielectric resonator and a penetrating hole formed in the center of said cavity so as to penetrate said main mold; and a pair of sub-molds formed so as to insert said penetrating hole, said sub-molds being slid in said penetrating hole in a direction towards front and back surfaces of said case so that the height of projection of said sub-mold into said cavity can be changed.

According to a further aspect of the present invention, there is provided a manufacturing apparatus for manufacturing the above described dielectric resonator apparatus with at least one coupling projection, wherein said manufacturing apparatus comprises:

a pair of main molds having a cavity for forming said TM dual mode dielectric resonator and a penetrating hole formed in the center of said cavity so as to penetrate said main mold; and a pair of sub-molds formed so as to insert said penetrating hole, said sub-molds being slid in said penetrating hole in a direction towards front and back surfaces of said case so that the depth of said sub-mold pulled-into said cavity can be changed.

According to the dielectric resonator apparatus of the present invention, by adjusting the depths of the coupling grooves formed on the front and back surfaces of the crossing portion of both the dielectric resonators, the coupling coefficient between both the dielectric resonators can be adjusted. Further, by adjusting the heights of the coupling projections formed on the front and back surfaces of the crossing portion of both the dielectric resonators, the coupling coefficient between both the dielectric resonators can be adjusted.

In this case, since the coupling grooves and the coupling projections are formed on the front and back surfaces of the TM dual mode dielectric resonator, the direction of the depths of the coupling grooves and the direction of the heights of the coupling projections can be made to be parallel to the opening direction of a pair of molds, and thus a molded body can be easily taken off from the molds after forming the molded body of the dielectric resonator apparatus using a pair of molds. Further, designing the molds can be made to be easier than the molds of the conventional apparatus.

Furthermore, since the coupling coefficient between both the dielectric resonators can be adjusted by adjusting the depths of the coupling grooves and the heights of the coupling projections, the sub-molds of the molds for forming the coupling grooves and the coupling projections are formed so as to be slid. When the position of the sub-mold is slidably adjusted, the depths of the coupling grooves and the heights of the coupling projections can be adjusted. Then the coupling coefficient can be easily adjusted without any cutting process or the like. Further, since the depths of the coupling grooves and the heights of the coupling projections can be changed by moving the sub-mold, a plurality of kinds of dielectric resonator apparatuses having different coupling coefficients can be manufactured using one kind of a pair of molds.

According to the present invention, since the directions of the depths of the coupling grooves and the directions of the heights of the coupling projections for adjusting the coupling coefficient can be made to be parallel to the opening direction of a pair of molds, the molding body can be easily taken off from the molds, and the molds can be easily designed.

Further, since the depths of the coupling grooves and the heights of the coupling projections can be easily adjusted by moving the sub-mold, the coupling coefficient of the dielectric resonator apparatus can be adjusted by adjustment of the molds themselves without any cutting process or the like.

Accordingly, the mass productivity and manufacturing as of the dielectric resonator apparatus can be improved.

Further, since the dielectric resonator apparatuses having various kinds of coupling coefficients can be formed by adjusting the position of the sub-mold, the dielectric resonator apparatuses having various kinds of coupling coefficients can be formed using one pair of molds. This results in that the manufacturing cost of the molds can be decreased.

BRIEF DESCRIPTION OF THE DRAWINGS

These and other objects and features of the present invention will become clear from the following description of embodiments thereof with reference to the accompanying drawings throughout which like parts are designated by like reference numerals, duplicate descriptions of such like parts being omitted, and in which.

DETAILED DESCRIPTION OF THE PREFERRED EMBODIMENTS

The preferred embodiments according to the present invention will be described below with reference to the attached drawings.

Figure 1:
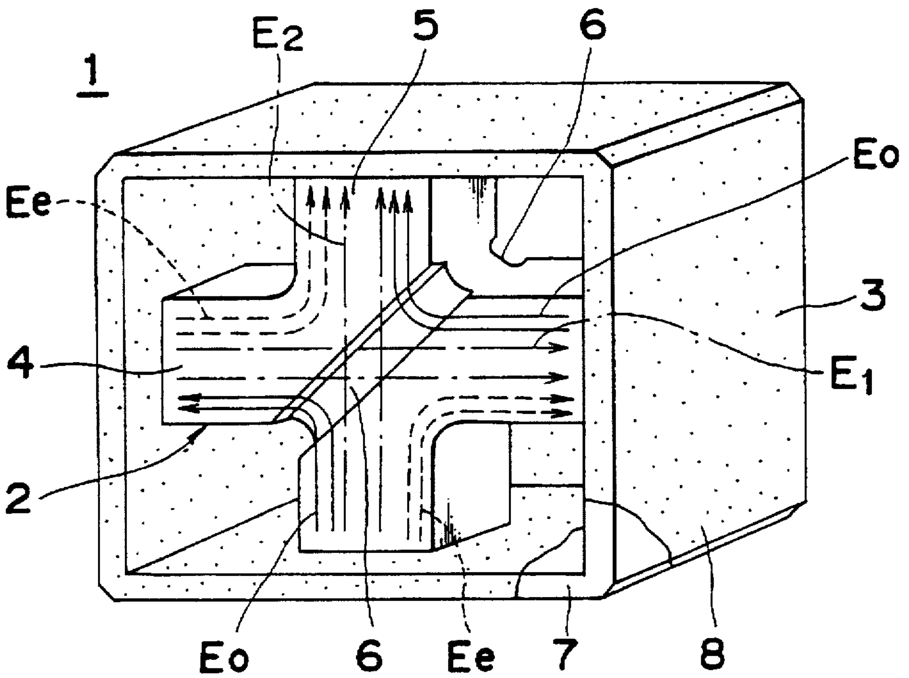
FIG. 1 is a partially broken perspective view of a TM dual mode resonator apparatus comprising a TM dual mode dielectric resonator according to a preferred embodiment of the present invention.

FIG. 1 is a partially broken perspective view of a cross-shaped TM dual mode dielectric resonator apparatus 1 according to a preferred embodiment of the present invention.

Referring to FIG. 1, in the TM dual mode dielectric resonator apparatus 1, a TM dual mode dielectric resonator 2 is provided or mounted within a rectangular-cylinder-shaped electrically conductive case 3 having front and back opening surfaces which functions as a waveguide. The TM dual mode dielectric resonator 2 is made of a dielectric ceramics material, and is constituted by integrally forming two TM mode rectangular-cylinder-shaped dielectric resonators 4 and 5 in a shape of a cross so that the longitudinal direction of the dielectric resonator 4 is perpendicular to that of the dielectric resonator 5. In the front and back surfaces, which respectively oppose to the front and back opening surfaces of the case 3, of a crossing portion of the two dielectric resonators 4 and 5 (referred to as a crossing portion hereinafter) formed in a shape of the cross of the TM dual mode dielectric resonator 2, coupling grooves 6 for coupling an operation mode of the dielectric resonator 4 with that of the dielectric resonator 5 are formed in a diagonal direction of the crossing portion, respectively, so as to extend from the top right corner of the crossing portion to the bottom left corner thereof on the front and back surfaces, and so as to respectively have depths in a direction towards the front and back surfaces of the case main body 3, one coupling groove 6 extending from the front surface of the crossing portion towards the back surface thereof, and another coupling groove 6 extending from the back surface of the crossing portion towards the front surface thereof. The coupling grooves 6 are formed in order to cut the electric lines Ee of force of the even mode. Further, the case 3 is constituted by forming electrically conductive electrodes 8 on all the surfaces of a case main body 7 made of a dielectric ceramics material by plating the same with a metal paste, through a vapor deposition method of depositing a thin metal film on the same or the like.

Figure 5:
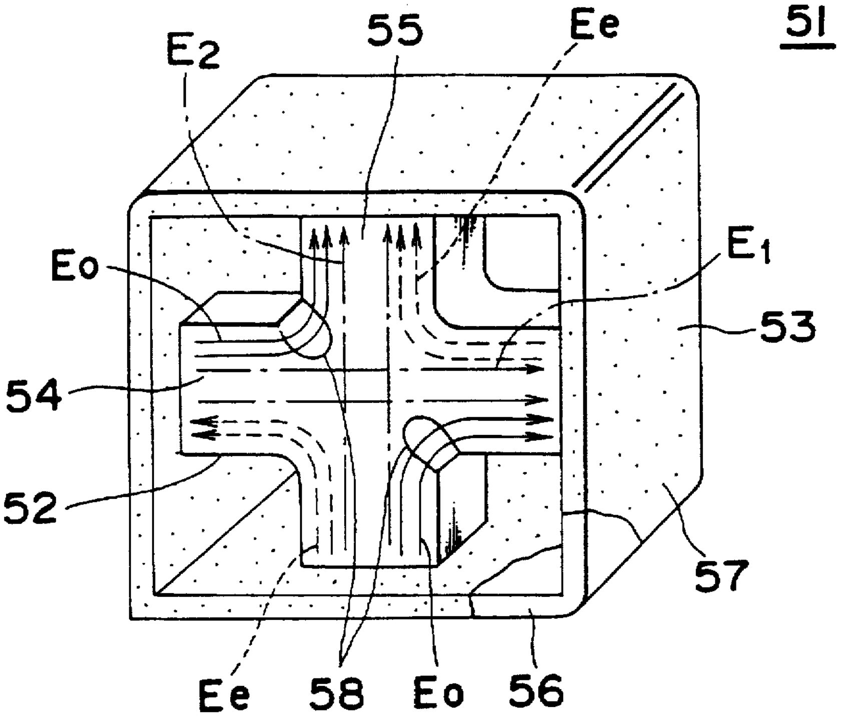
Fig. 5 PRIOR ART
FIG. 5 is a partially broken perspective view of a conventional TM dual mode dielectric resonator apparatus comprising a TM dual mode dielectric resonator.

As shown in FIG. 1, in a manner similar to that of FIG. 5, the following electric lines of force are in the TM dual mode dielectric resonator 2:

(a) electric lines $E_1$ and $E_2$ of force of the respective dielectric resonators 4 and 5 indicated by alternate long and short dash lines;

(b) electric lines Ee of force of the even mode indicated by dotted lines; and (c) the other electric lines Eo of force of the odd mode indicated by solid lines.

In the dielectric resonator apparatus 1, when the respective depths of the coupling grooves 6 are increased, the effective dielectric constant depending on the electric lines Eo of force of the odd mode decreases, whereas when the respective depths of the coupling grooves 6 are decreased, the effective dielectric constant depending on the electric lines Eo of force of the odd mode increases. Further, when the respective depths of the coupling grooves 6 are changed, the coupling coefficient between the dielectric resonators 4 and 5 changes and can be thus adjusted.

Figure 2:
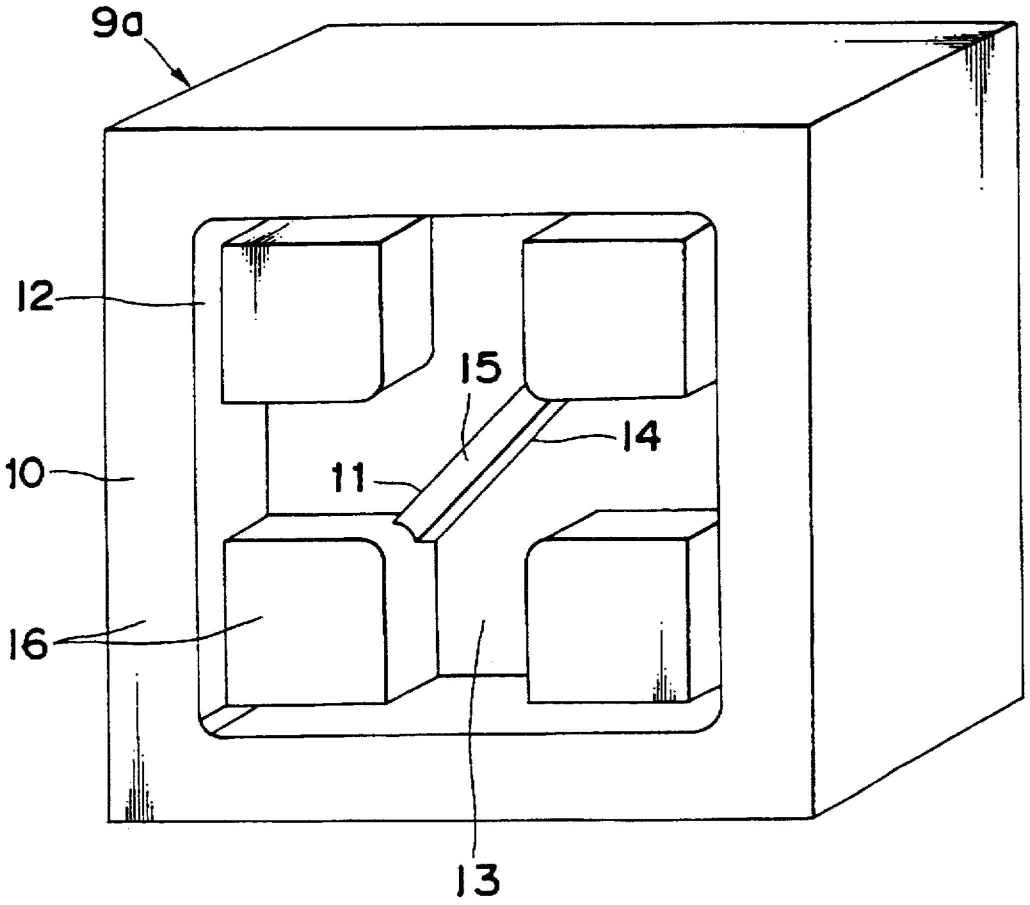
FIG. 2 is a perspective view of one mold of a pair of molds for forming the TM dual mode dielectric resonator apparatus shown in FIG. 1.
Figure 3:
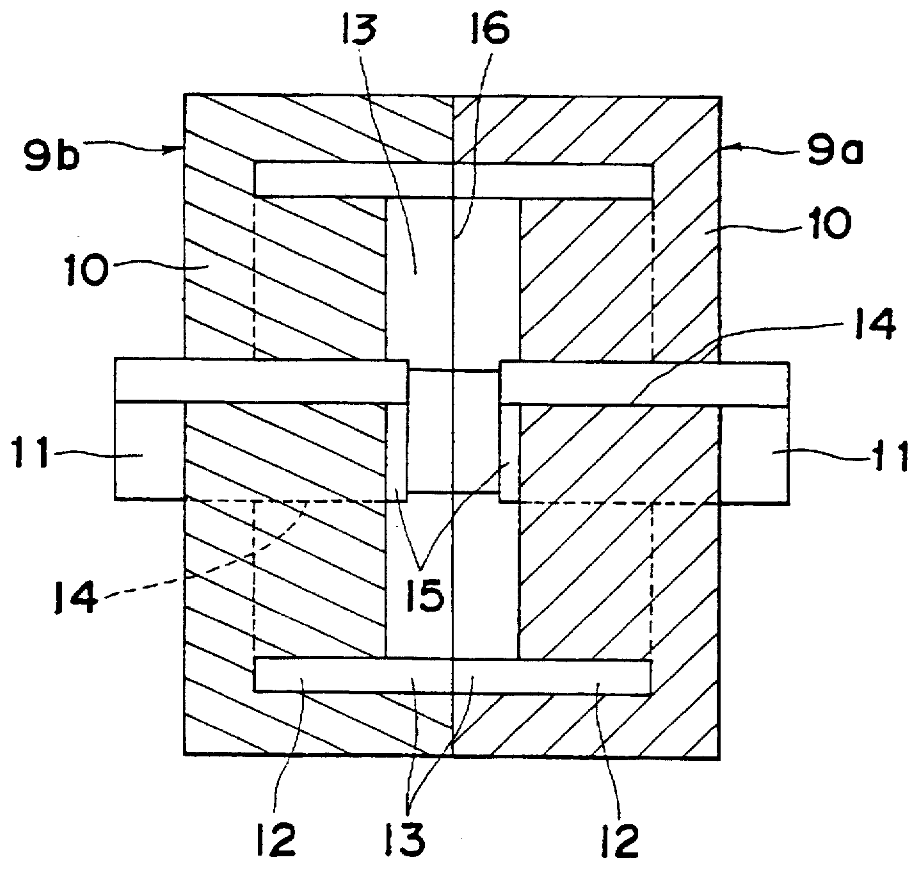
FIG. 3 is a cross-sectional view of a pair of molds for forming the TM dual mode dielectric resonator apparatus shown in FIG. 1.

The case main body 7 is formed integrally and simultaneously with the TM dual mode dielectric resonator 2 using a pair of molds 9*a* and 9*b* (see FIG. 3). FIG. 2 is a perspective view of one mold 9*a* of a pair of molds 9*a* and 9*b* (see FIG. 3) for integrally forming the TM dual mode dielectric resonator 2 and the case main body 7 of FIG. 1.

Referring to FIG. 2, the mold 9*a* has a divided structure comprised of a frame-shaped main mold 10 and a sub-mold 11. In the inner peripheral portions of a concave portion for forming the apparatus 1 formed in the center of the main mold 10, a rectangular-ring-shaped cavity 12 for forming the case main body 7 (see FIG. 1) is formed, and on the inside of the cavity 12, a cross-shaped cavity 13 for forming the TM dual mode dielectric resonator 2 (see FIG. 1) is formed. Further, in the main mold 10, a rectangular-cylinder-shaped penetrating hole 14 having an opening in the diagonal direction of the cavity 13 is formed so as to penetrate the main mold 10 in a direction from the front surface to the back surface. Further, the sub-mold 11 has the same cross section as that of the penetrating hole 14 of the main mold 10, and is inserted so as to be slid in the penetrating hole 14 in the direction towards the opening surface of the case 3 (see FIG. 1). A groove forming portion 15 of the sub-mold 11 located at the end surface thereof is formed so as to project into the cavity 13, and the height of the projection of the groove forming portion 15 can be adjusted by sliding the sub-mold 11 in the penetrating hole 14.

Another mold 9b is formed so as to have a symmetric structure to that of the mold 9a with respect to a mold opening surface 16 between a pair of molds 9a and 9b. As shown in FIG. 3, when a pair of molds 9a and 9b is combined, the cavity 13 of a space for forming the apparatus 1 (see FIG. 1) is formed.

Further, pressing forces are applied towards a dielectric ceramics material onto the front and back surfaces of the molds 9a and 9b so as to be opposite to each other after the dielectric ceramics material is inserted between a pair of molds 9a and 9b, and then the dielectric ceramics molding body comprised of the TM dual mode dielectric resonator 2 and the case main body 7 can be formed simultaneously. In this case, the coupling grooves 6 (see FIG. 1) of the TM dual mode dielectric resonator 2 are formed by the groove forming portion 15 projecting into the cavity 13. Further, when the height of the projection into the cavity 13 is adjusted by sliding the sub-mold 11 within the penetrating hole 14 in the direction forwards the opening surface of the case 3, the depths of the coupling grooves 6 can be adjusted. After predetermined processes including a firing process or the like are performed for the dielectric ceramics forming body thus formed, the electrically conductive electrodes 8 are formed on all the surfaces of the case main body 7 made of a dielectric ceramics material by plating the case with a metal paste, through a vapor deposition method for depositing a thin metal film on the case, or by another method, resulting in the manufactured dielectric resonator apparatus 1.

Figure 6:
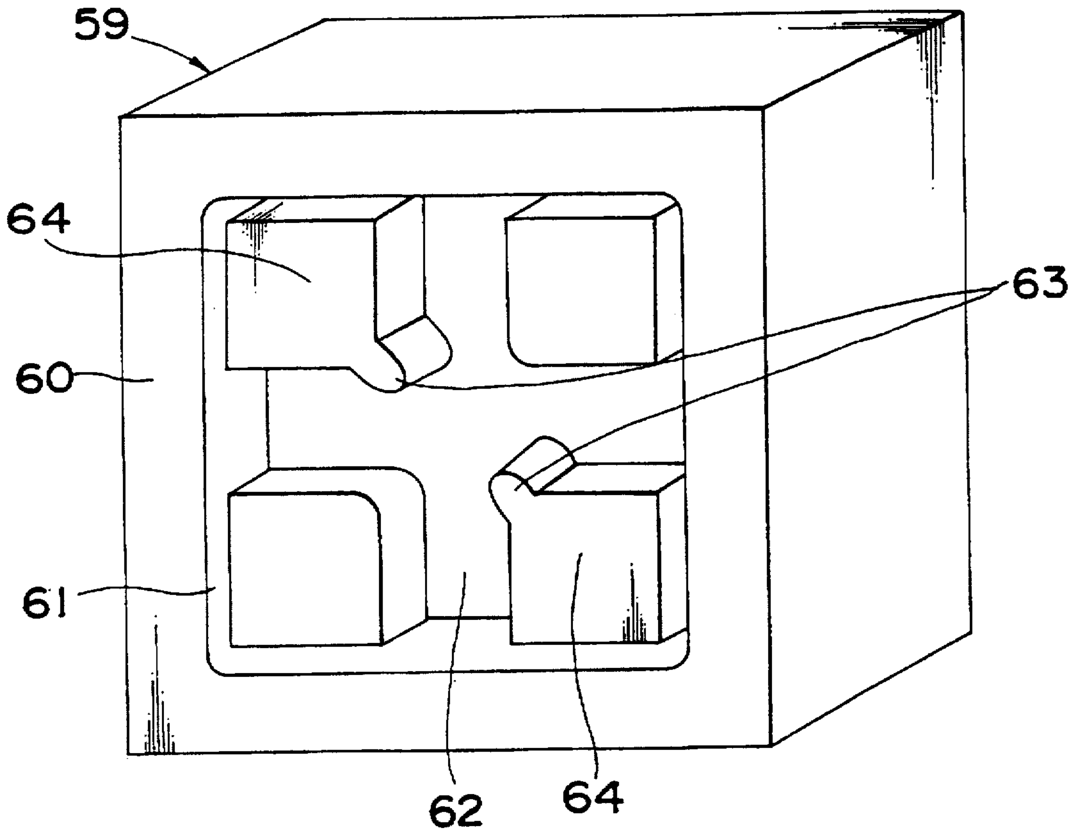
Fig. 6 PRIOR ART
FIG. 6 is a perspective view of one mold of a pair of molds for forming the conventional TM dual mode dielectric resonator apparatus shown in FIG. 5.

In the conventional dielectric resonator apparatus 51 and the molds 59 thereof, shown in FIGS. 5 and 6, the molds 59 are designed and manufactured, and the dielectric resonator apparatus 51 is manufactured using the mold 59. Thereafter, the coupling coefficient thereof is measured. In this case, when the measured coupling coefficient thereof is different from a desirable design value thereof, it is extremely difficult to change any size of the molds 59. Then it is required to manufacture the molds 59 again, or to fine adjust the coupling coefficient by cutting the coupling grooves 58 of the dielectric resonator apparatus 51 manufactured using the previous molds 59.

On the other hand, in the case of a pair of molds 9a and 9b, when the coupling coefficient of the manufactured dielectric resonator is different from the desirable design value thereof, the coupling coefficient thereof can be adjusted by adjusting the position of the sub-mold 11 so as to be slid. In the stage of obtaining a desirable coupling coefficient thereof, the sub-mold 11 can be fixed.

Further, in the conventional molds 59, it is necessary to provide the number of molds 59 corresponding to the number of the kinds of the dielectric resonator apparatuses having different coupling coefficients. On the other hand, in the present preferred embodiment of the present invention, the coupling coefficient thereof can be adjusted by adjusting the height of the projection of the sub-mold 11, and many kinds of dielectric resonator apparatus 51 having many kinds of coupling coefficients can be manufactured using one kind of a pair of molds 9a and 9b.

Further, when the formed dielectric ceramics molding body is taken off from a pair of molds 9a and 9b, the sub-mold 11 can be easily taken off from the coupling grooves 6. This results in that the forming process becomes easier than that of the conventional apparatus.

Figure 4:
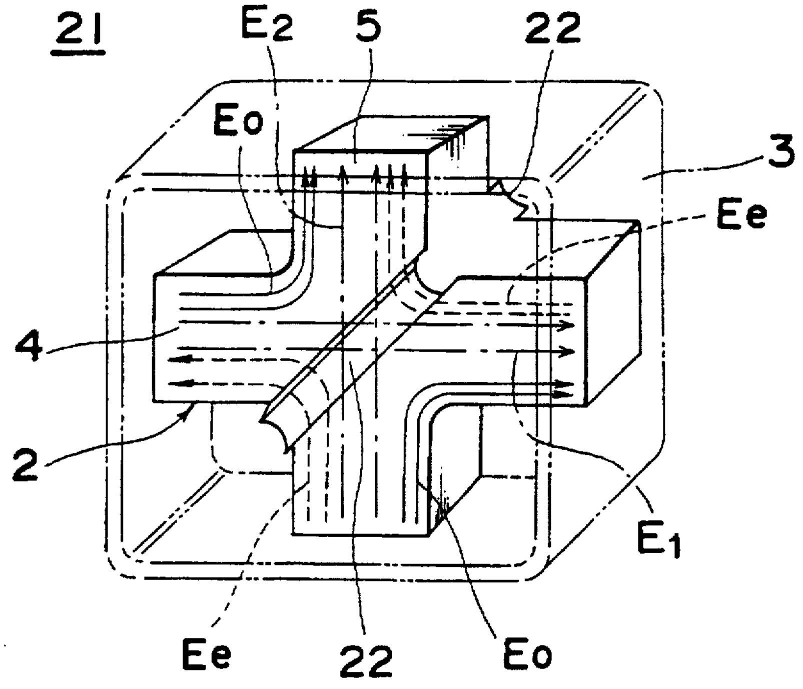
FIG. 4 is a partially broken perspective view of a TM dual mode dielectric resonator apparatus comprising a TM dual mode dielectric resonator according to another preferred embodiment of the present invention.

FIG. 4 is a perspective view of a TM dual mode dielectric resonator 21 according to another preferred embodiment of the present invention. In the dielectric resonator apparatus 21, instead of the coupling grooves 6, coupling projections 22 are formed in a diagonal direction of the crossing portion so as to extend from the top right corner thereof to the bottom left corner thereof, and so as to respectively project towards the front and back surfaces of the case 3. The coupling projections 22 are formed so as to disturb the electric lines Ee of force of the even mode. In this case, the coupling coefficient between the dielectric resonators 4 and 5 can be adjusted by adjusting the height of projection of each of the coupling projections 22 in the direction towards the front and back surfaces of the case 3.

Figure 7:
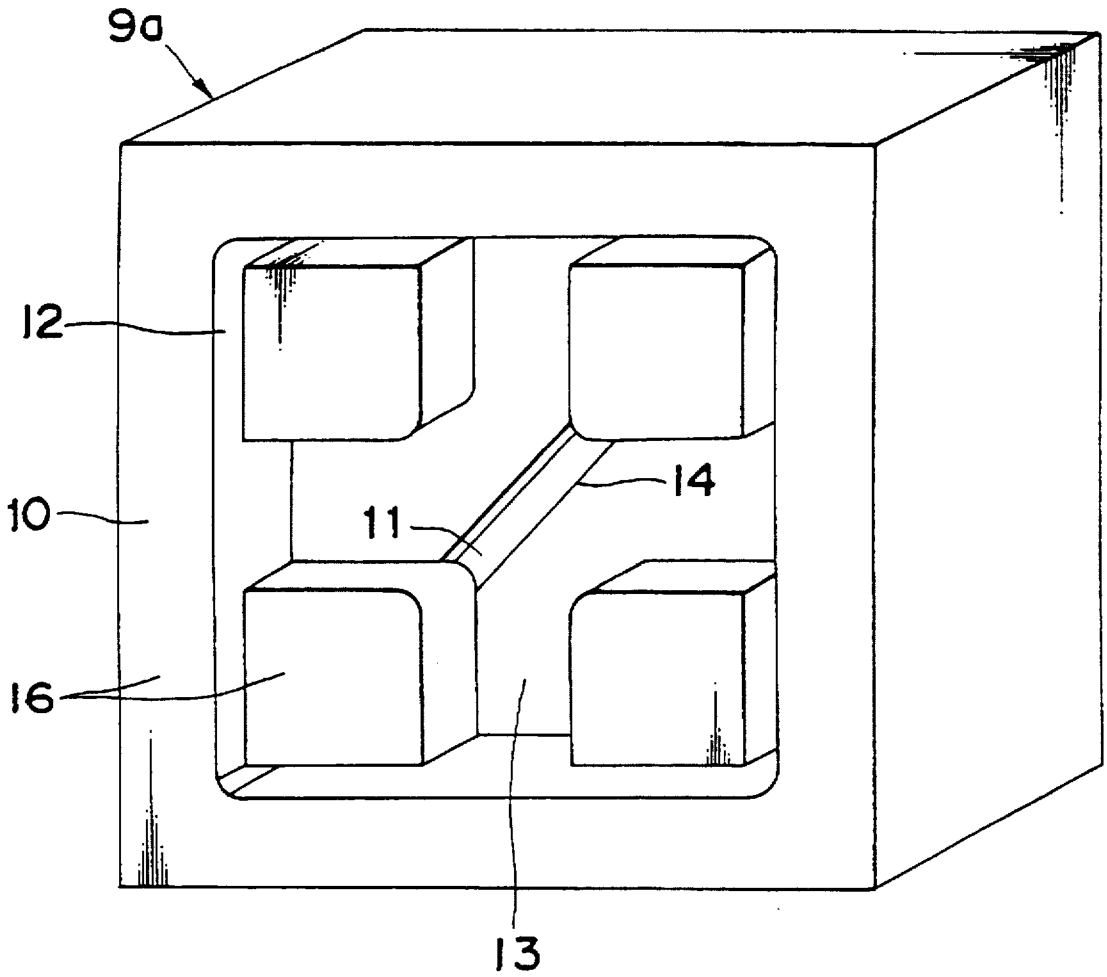
FIG. 7 is a perspective view of one mold of a pair of molds for forming the TM dual mode dielectric resonator apparatus shown in FIG. 4.

The dielectric resonator apparatus 21 can be formed using a pair of molds 9a and 9b shown in FIGS. 2 and 3. That is, the sub-mold 11 is formed so as to project from the penetrating hole 14 in the dielectric resonator apparatus 1. On the other hand, in order to form the dielectric resonator apparatus 21, the sub-mold 11 is formed so as to insert or pull into the penetrating hole 14, as shown in FIG. 7. Then the partially exposed penetrating hole 14 becomes a mold concave for forming the coupling projections 22 of FIG. 1. Then the height of projection of the coupling projections 22 can be changed by adjusting the pulling-in depth of the mold concave of the sub-mold 11 into the penetrating hole 14.

In the above-mentioned preferred embodiments, the coupling grooves 6 and the coupling projections 22 are formed on the front and back surfaces of the crossing portion, however, the coupling grooves 6 and the coupling projections 22 may be formed on at least one of the front and back surfaces of the crossing portion. Further, the coupling grooves 6 and the coupling projections 22 may be formed so as to extend from the top left corner of the crossing portion to the bottom right corner thereof, in order to cut or disturb the electric lines Eo of force of the odd mode.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A manufacturing apparatus for manufacturing a dielectric resonator apparatus;

wherein said dielectric resonator apparatus comprises:

a cross-shaped TM dual mode dielectric resonator provided in a electrically conductive case, said TM dual mode dielectric resonator comprising first and second dielectric resonators integrally formed so as to be perpendicular to each other; and at least one coupling groove for coupling an operation mode of said first dielectric resonator with an operation mode of said second dielectric resonator, formed on at least one of a front surface and a back surface of a crossing portion of said first and second dielectric resonators, in a diagonal direction of said crossing portion so as to cut electric lines of force of either one of an odd mode and an even mode, wherein said manufacturing apparatus comprises:

a pair of main molds each having a cavity for forming said TM dual mode dielectric resonator and a penetrating hole formed in the center of said cavity so as to penetrate said main mold; and a pair of sub-molds formed so as to insert said penetrating hole, said sub-molds being slid in said penetrating hole in a direction towards front and back surfaces of said case so that the height of projection of said sub-mold into said cavity can be changed.

2. A manufacturing apparatus for manufacturing a dielectric resonator apparatus;

wherein said dielectric resonator apparatus comprises:

a cross-shaped TM dual mode dielectric resonator provided in a electrically conductive case, said TM dual mode dielectric resonator comprising first and second dielectric resonators integrally formed so as to be perpendicular to each other; and at least one coupling projection for coupling an operation mode of said first dielectric resonator with an operation mode of said second dielectric resonator, formed on at least one of a front surface and a back surface of a crossing portion of said first and second dielectric resonators, in a diagonal direction of said crossing portion so as to disturb electric lines of force of either one of an odd mode and an even mode, wherein said manufacturing apparatus comprises:

a pair of main molds having a cavity for forming said TM dual mode dielectric resonator and a penetrating hole formed in the center of said cavity so as to penetrate said main mold; and a pair of sub-molds formed so as to insert said penetrating hole, said sub-molds being slid in said penetrating hole in a direction towards front and back surfaces of said case so that the depth of said sub-mold pulled-into said cavity can be changed.

* * * * *